(12) United States Patent
Renshall et al.

(10) Patent No.: US 6,168,116 B1
(45) Date of Patent: Jan. 2, 2001

(54) SHEAR TIE DEVICE

(75) Inventors: James T. Renshall, Ojai; Geoffrey W. Marks, Santa Barbara, both of CA (US)

(73) Assignee: TRW Astro Aerospace, Carpinteria, CA (US)

( * ) Notice: Under 35 U.S.C. 154(b), the term of this patent shall be extended for 0 days.

(21) Appl. No.: 09/336,788

(22) Filed: Jun. 21, 1999

(51) Int. Cl.[7] .................................................. B64G 1/44
(52) U.S. Cl. ............................................................ 244/173
(58) Field of Search ................................ 244/173, 158 R, 244/163; 410/132, 135, 140, 142, 144; 403/12, 32, 37; 136/245, 292

(56) References Cited

U.S. PATENT DOCUMENTS

| 559,911 | 5/1896 | Sheridan . |
| 3,434,748 | 3/1969 | Leurent . |
| 3,458,052 | 7/1969 | Kann . |
| 3,537,736 | 11/1970 | Kroopp . |
| 3,672,710 | 6/1972 | Kroopp . |
| 4,540,873 | 9/1985 | Kester . |
| 4,988,060 * | 1/1991 | Janson et al. .................... 244/173 |

FOREIGN PATENT DOCUMENTS

| 1426294 | 4/1966 | (FR) . |
| 197421 | 5/1923 | (GB) . |
| 403207 | 6/1966 | (SE) . |

* cited by examiner

Primary Examiner—Peter M. Poon
Assistant Examiner—Francis T. Palo
(74) Attorney, Agent, or Firm—Knobbe, Martens, Olson & Bear, LLP (57) ABSTRACT

A spacecraft, such as a satellite, includes a panel array comprised of a plurality of panels that are stacked together and secured to the side of the satellite during launch. At least one shear tie device is configured to couple the panels together in shear to increase the resistance to deformation of the stack of panels. The shear tie device preferably comprises a male member that mates with a female member. A plurality of fingers secure the male member within the female member during launch. Upon reaching orbit, a bladder is inflated which deforms the fingers and releases the male member from engagement with the female member.

20 Claims, 7 Drawing Sheets

SHEAR TIE DEVICE

BACKGROUND OF THE INVENTION

1. Field of the Invention

The present invention relates to orbiting spacecraft with deployable lightweight panels. More particularly, the present invention relates to an automatically releasing shear tie device which couples the lightweight panels together into a rigid structure. The shear tie device automatically releases the panels to achieve their operating position upon reaching orbit.

2. Description of the Related Art

Orbit-type spacecraft are commonly equipped with a set of deployable panels, such as solar panels, radar panels, or antenna panels. During the launch phase of the spacecraft, the panels are folded over one another in an accordion-like fashion so that the panels form a compact stack. The stack of panels is then attached to the side wall of the spacecraft using a tie-down device that extends through the center of the stack. After the spacecraft reaches orbit, the stack of panels is released and unfolded so that the panels align edge-to-edge within a common plane.

The individual panels desirably have certain structural qualities. The panels are desirably thin and lightweight so that the panels do not overly increase the payload weight of the spacecraft or consume too much space within the spacecraft cargo bay. However, while it is highly desirably for the panels to be thin and lightweight, they should also be sufficiently strong to survive the rigorous loads that are often encountered during launch. The panels should also be thick enough to avoid coupling with the low-frequency excitation of the launch vehicle, which may cause the panels to buckle. Unfortunately, thinner and lighter panels have lower resonant frequencies and lower strengths which increases the likelihood of the panels coupling with the low-frequency excitation of the launch vehicle and deforming during launch.

The Applicant has observed that this problem may be overcome by binding or tieing the panels together during the launch phase so that the stack of panels functions as a single, thick structure that is capable of absorbing and withstanding the launch loads. There is therefore a need for a device that may be used to easily and reliably distribute the shear force between adjacent panels during launch. Desirably, the device automatically releases the panels upon reaching orbit with a reduced likelihood of jamming during such release.

SUMMARY OF THE INVENTION

The aforementioned needs are satisfied by the present invention which relates to a shear tie device for coupling together deployable panels on a satellite. The shear tie device provides a tight fitting shear tie through the launch phase of the spacecraft and automatically releases on orbit with little or no risk of jamming. The mechanism of release advantageously provides a smooth separating force between the panels to reduce the likelihood of harming the satellite during separation. Advantageously, the triggering mechanism for the release is a change in environmental or ambient conditions, such as the environmental state change that occurs as a result of achieving orbit.

One embodiment of the shear tie device comprises a post disposed on one panel. The post is initially secured within a ring of fingers located inside a cavity in an adjacent panel. This configuration is preferably maintained throughout the launch phase of the satellite. The fingers are preferably sufficiently stiff so that when the post pushes against the fingers in a transverse direction, the fingers will inhibit movement of the post and provide the requisite shear coupling between the panels. However, the fingers are sufficiently flexible so that when pressure is applied to an underside thereof, the fingers will bend up and away from the post, providing axial freedom for the post.

A partially deflated annular bladder resides in the cavity beneath the fingers. As the ambient pressure decreases to below a threshold value, the bladder preferably inflates and exerts a force against the underside of the fingers. Upon reaching orbit, the annular bladder preferably inflates sufficiently to cause the fingers to flex upward and away from the post. As the fingers flex away from the post, the post is free to move away from the cavity along the longitudinal axis of the post. Advantageously, the fingers also exert a separating force between the panels as the fingers flex upward. In an alternate embodiment of the device an annular wall separates the post from the annular bladder.

When the bladder expands, the annular wall prevents the bladder from contacting the post.

In one aspect of the invention, there is disclosed an apparatus for coupling a first panel to a second panel. The apparatus comprises at least one male member extending outwardly from a surface of the first panel and at least one female member extending into a surface of the second panel. The female member is positioned to receive the male member when the first panel is juxtaposed with the second panel. The apparatus additionally comprises at least one finger extending radially into the female member. The finger defines an aperture sized to receive the male member. A bladder is positioned within the female member. The bladder consumes a first volume when exposed to a first ambient pressure and a second volume when exposed to a second ambient pressure below the first ambient pressure. The bladder exerts a force on the finger sufficient to deform the finger and increase the size of the aperture when the bladder is at the second volume.

In another aspect of the invention, there is disclosed an apparatus for coupling a first panel to a second panel. The apparatus comprises at least one post on the first panel and at least one cavity on the second panel which is configured to receive the post. The apparatus additionally comprises a plurality of radial fingers coupled to the cavity. The radial fingers desirably have edges that form an aperture dimensioned to receive the post.

The apparatus additionally comprises means for deflecting at least one of the plurality of fingers to increase the size of the aperture.

In yet another aspect of the invention, there is disclosed a spacecraft, comprising a first panel defining a front surface and a second panel defining a front surface. The first and second panels are configured to move between a folded position wherein the front surfaces are juxtaposed and a deployed position wherein the first and second panels are aligned within a common plane. At least one male member is on the front surface of the first panel and at least one female member is on the front surface of the second panel. The female member defines an aperture configured to receive the male member therein when the first and second panels are in the deployed position. The size of the aperture increases as ambient pressure decreases.

BRIEF DESCRIPTION OF THE DRAWINGS

These and other features of the invention will now be described with reference to the drawings of a preferred embodiment, which are intended to illustrate and not to limit the invention, and in which.

DETAILED DESCRIPTION OF THE PREFERRED EMBODIMENTS

Figure 1:
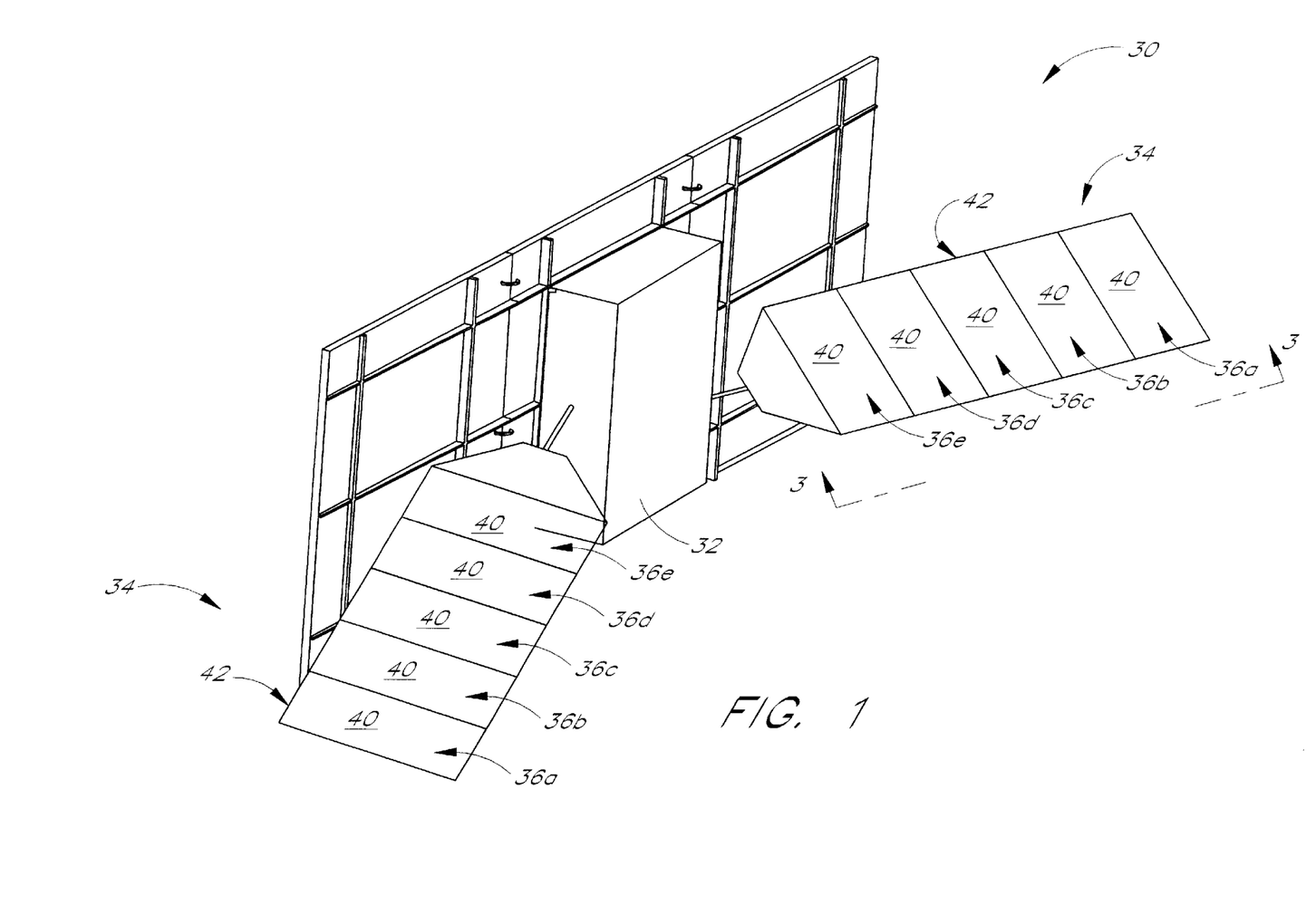
FIG. 1 is a perspective view of a satellite having a panel array in a deployed state.

FIG. 1 is a perspective view of a satellite 30 comprised of a main body 32 and at least one panel array 34 mounted thereto. Each panel array 34 is comprised of a plurality of panels 36a–e that are coupled to one another at adjacent edges thereof. The panels 36 may comprise any type of panels that are used with satellites, such as, for example, solar panels, radar panels, etc, as will be known to those of skill in the art. The panels 36 are flat structures that each define a planar front surface 40 and an opposed rear surface 42. FIG. 1 shows the panel arrays 36 in a deployed state, wherein the individual panels 36 are positioned edge-to edge with the front surfaces 40 preferably aligned within a common plane.

Figure 2:
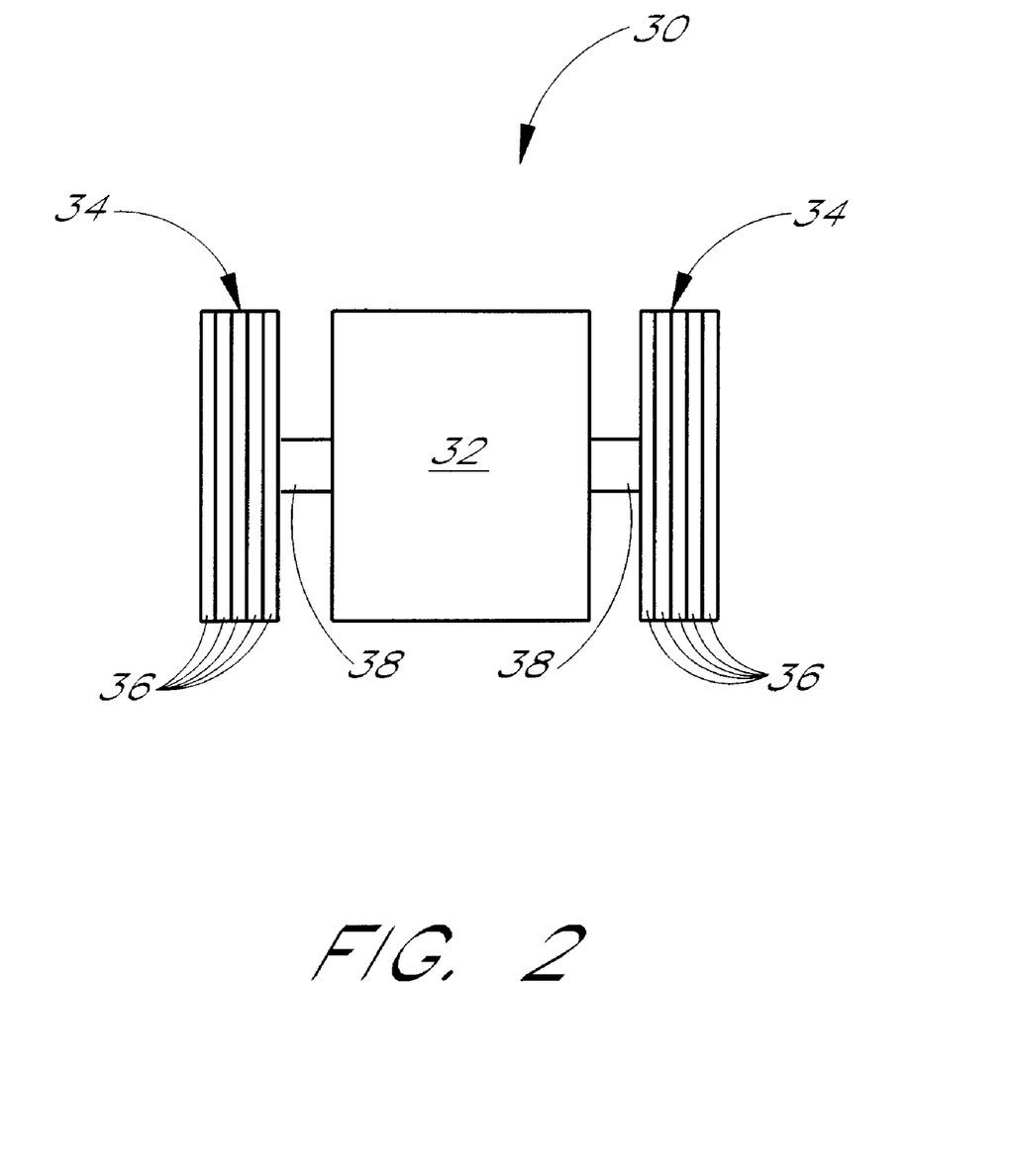
FIG. 2 is a schematic illustration of the satellite with the panel array in a stowed or folded state.

FIG. 2 is a schematic illustration of the satellite 30 with the panel array 34 in a stowed or storage configuration in which the panels are in a folded state. The panels 36 are desirably folded in an accordion-like fashion to form a stack of panels that is secured to the main body 32 using at least one tie-down mechanism 38, as will be known to those of skill in the art. When stowed, the front surface 40 and rear surface 42 of one panel 36 is juxtaposed with the front surface 40 and rear surface 42, respectively, of an adjacent panel 36. The panel array 34 is preferably maintained in the folded state during launch and then deployed to the extended state upon reaching orbit.

Figure 3:
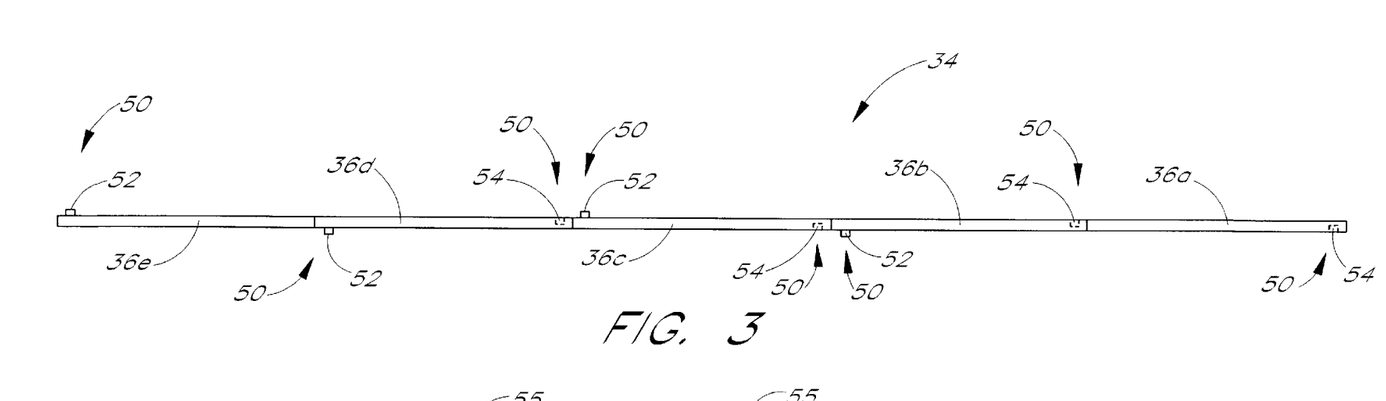
FIG. 3 is a top plan view of a panel array in the deployed state.

FIG. 3 shows an edgewise view of a single, extended panel array 34 along line 3—3 of FIG. 1. The panel array 34 desirably includes a plurality of securing devices comprised of shear tie devices 50 that are configured to couple the panels 36 together in shear and to distribute the shear force throughout the panels 36 when the array 34 is folded. The shear tie devices 50 may comprise a first member on one panel that couples with a second member on an adjacent panel to thereby couple adjacent panels to one another in shear and inhibit movement of the panels with respect to one another. When coupled together in such a manner, the stack of panels 36 effectively functions as a single, thick structure that is stiffer and more resistant to deformation than a single panel.

The shear tie devices 50 are configured to decouple such that the panels 36 are no longer tied to one another in shear. Desirably, the first member of the shear tie device 50 automatically decouples or releases from the second member in response to a change in environment or ambient conditions, as described more fully below. The coupling of adjacent panels 36 is thus automatically released when the panels 36 undergo a change in environment or ambient conditions.

With reference to FIG. 3, in the articulated embodiment, each shear tie device 50 comprises a male member, such as a post 52, and a corresponding female member that defines a receptacle for the male member, such as a cavity 54 (shown in phantom). The posts 52 extend outwardly from the front surface 40 and/or the rear surface 42 of the panels 36. Each post has a corresponding cavity 54 on the front surface 40 or rear surface 42 of the panels 36.

Figure 4:
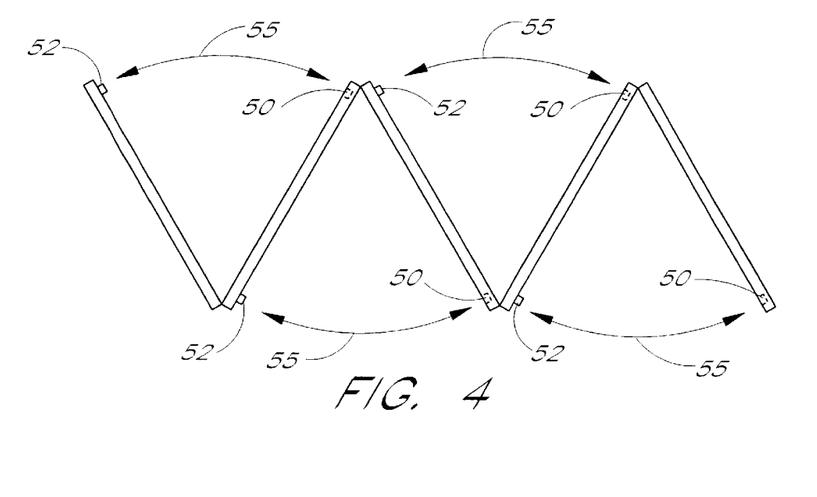
FIG. 4 is a top plan view of the panel array in a partially-folded state.

FIG. 4 shows the panel array 34 in a partially folded state. The shear tie devices 50 are preferably positioned such that each of the posts 52 aligns and mates with a corresponding cavity 54 when the panel array 34 is folded, as exhibited by the directional lines 55. The coupling of the posts 52 with the cavities 54 inhibits relative movement between the panels 36 when the array 34 is folded and also distributes shear forces across the surfaces of the panels 36.

Figure 4A:
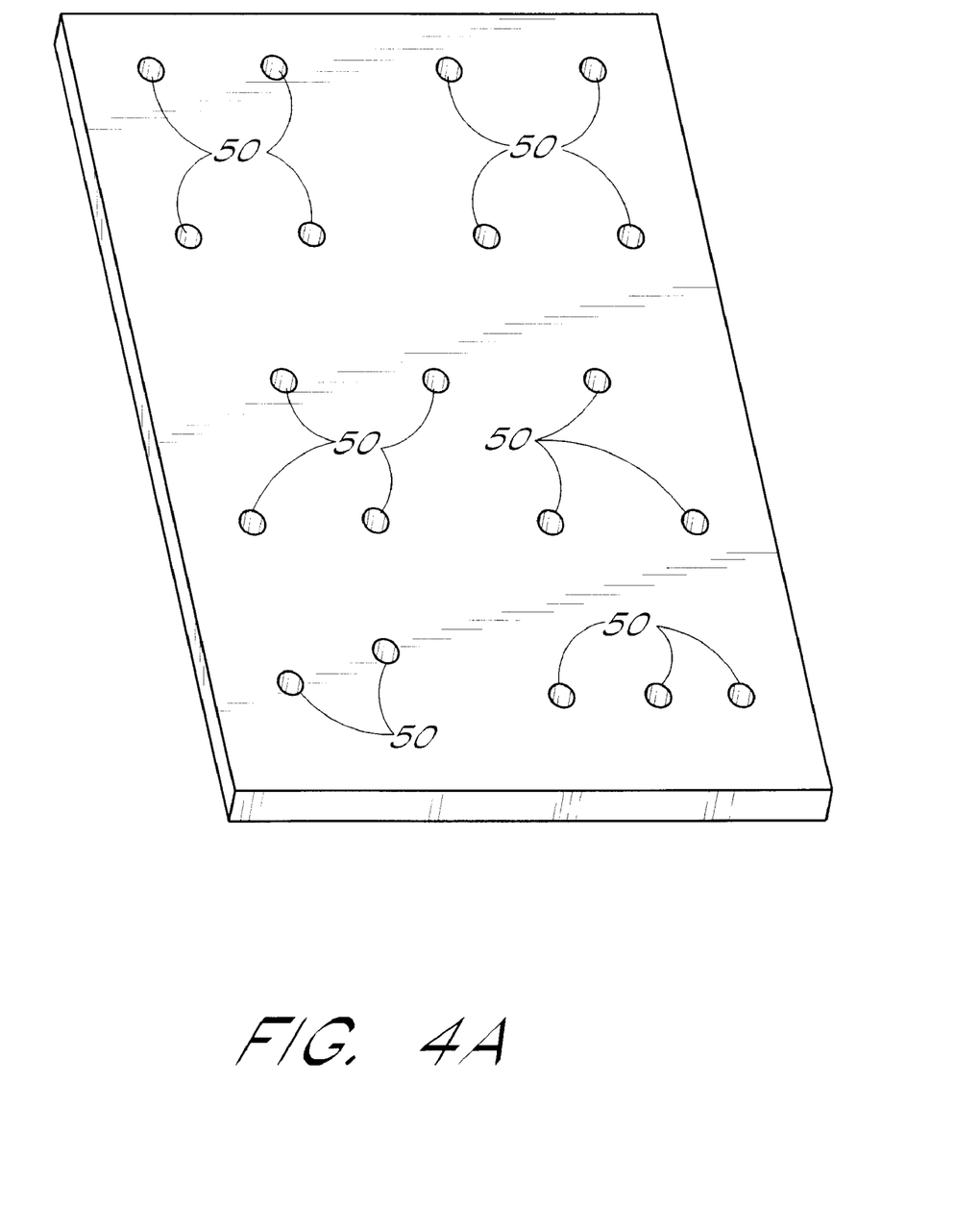
FIG. 4A is a perspective view of a single panel having a plurality of shear ties.

With reference to FIG. 4A, a plurality of shear ties 50 may be disposed at various locations on the front and/or rear surfaces 40, 42 of a panel 36. Any number of shear ties 50 may be distributed over the panels 36 depending on the desired shear coupling profile. In one embodiment, the shear ties 50 are located adjacent to each of the corners of the panels 36.

Figure 5:
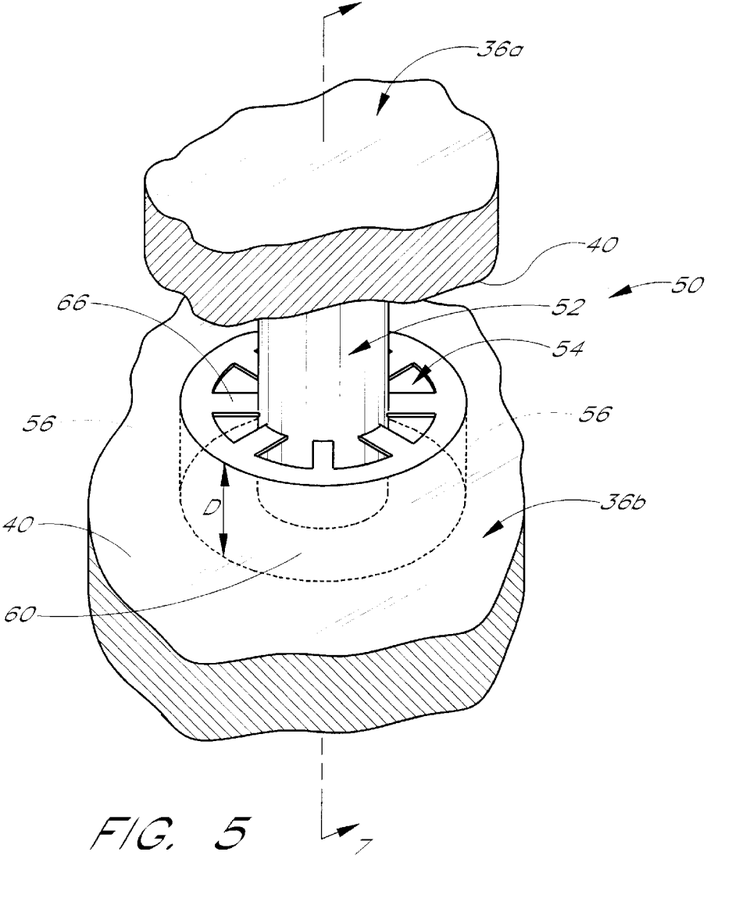
FIG. 5 is an enlarged perspective view of a shear tie device used with the panel array.

FIG. 5 is an enlarged perspective view of a single shear tie device 50 disposed between the panels 36a and 36b. Identical shear tie devices are preferably disposed at various locations between each of the panels 36a–e. The post 52 desirably comprises an elongated tube that extends outwardly from the front surface 40 of the panel 36a. The post 52 has a length L (FIG. 8), which is the distance from the base of the post 52 to an outer tip thereof. The post 52 is shown having a cylindrical shape with a circular cross-section. The cylindrical shape provides for ease of manufacturing and ease of fit within the cavity 54. However, the post 52 may define any of a wide variety of shapes in accordance with the disclosure herein.

With reference to FIG. 5, the cavity 54 comprises a partially enclosed volume that extends into the front surface 40 of the panel 36b. In the articulated embodiment, the cavity 54 has a circular cross-sectional shape, although the shape of the cavity 54 may vary. An annular peripheral or side wall extends downwardly into the panel 36 and defines the periphery of the cavity 54. The annular side wall 56 terminates at a lower end into a flat, circular bottom wall 60 that defines the bottom of the cavity 54. The cavity 54 has a depth D, which is defined as the distance from the front surface 40 of the panel 36 to the bottom wall 60. Preferably, the depth D of the cavity 54 is equal to or greater than the length L (FIG. 8) of the post 52 so that the post 52 may be fully inserted into the cavity 54 without abutting the bottom wall 60.

Figure 6:
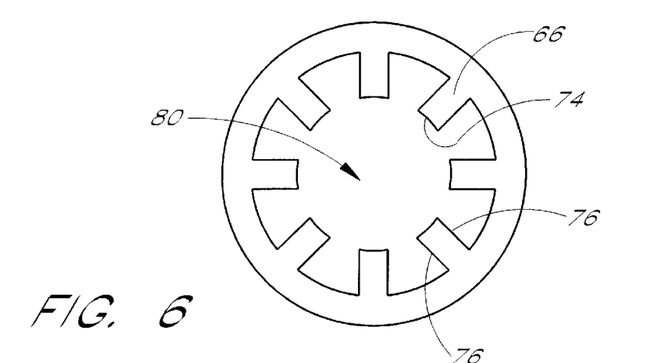
FIG. 6 is a top plan view of a female member of the shear tie device.

FIG. 6 is a to plan view of the cavity 54. With reference to FIGS. 5 and 6, a plurality of securing members comprised of fingers 66 are spaced around the periphery of the cavity 54. The fingers 66 extend radially inward over the cavity 54 from an upper edge of the side wall 56. The fingers 66 desirably comprise flat tabs each having a bottom surface 70 (FIG. 7) that faces the bottom wall 60 of the cavity 54, and an upper surface 72 (FIG. 7) opposed to the bottom surface 70. Each of the fingers 66 preferably has an inner edge 74 and a pair of opposed, radially-extending side edges 76.

The upper surfaces 72 of the fingers 66 are preferably aligned with a plane defined by the front surface 40 of the panel 36 so that the fingers 66 essentially enclose an upper edge of the cavity 54. The number of fingers 66 and the size of the spaces therebetween may vary.

The number of fingers 66 may be also increased or decreased, such as to vary the level of resistance to bending thereof or to vary the amount of allowable transverse movement between the post 52 and the fingers 66.

As best shown in FIG. 6, the inner edges 74 of the fingers 66 are spatially arranged to collectively define an aperture 80 that communicates with the cavity 54. The aperture 80 is dimensioned to receive the post 52 therethrough. In the illustrated embodiment, the aperture 80 has a circular shape that corresponds to the circular cross-sectional shape of the post 52, although the aperture 80 may define any of a wide variety of shapes that are configured to receive the post 52 in accordance with the disclosure herein. The aperture 80 preferably has a shape corresponding to that of the post 52 to facilitate easy sliding of the post 52 through the aperture 80. The number of fingers 66 may be increased to more specifically define the shape of the aperture 80.

Figure 7:
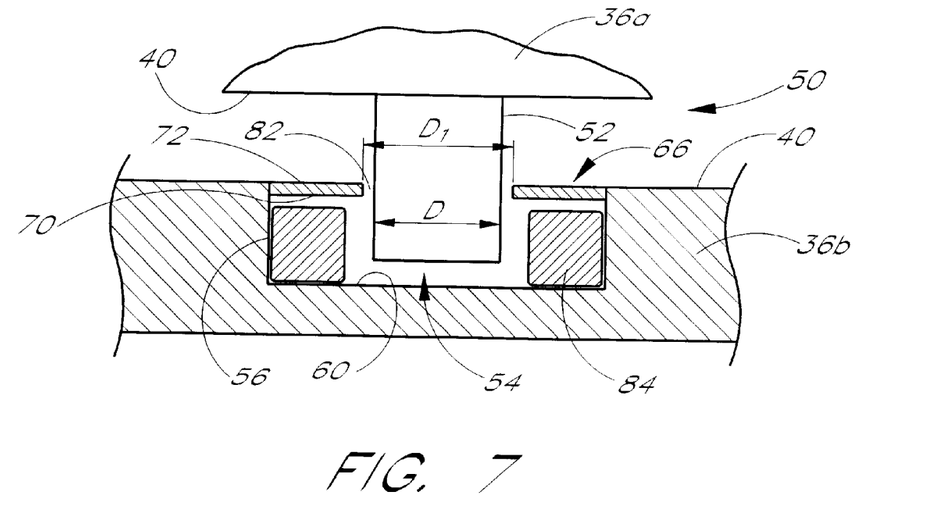
FIG. 7 is a cross-sectional view of the shear tie device along line 7—7 of FIG. 5.

FIG. 7 is a cross-sectional view of the shear tie device 50. Preferably, the diameter D of the post 52 is slightly greater than the diameter $D_1$ of the aperture 80. An annular gap 82 is therefore disposed between the inner edges 74 of the fingers 66 and the outer surface of the post 52. The gap 82 is preferably dimensioned such that the post 52 may slide through the aperture 80 without abutting the inner edges 74 of the fingers 66. Alternatively, the gap 82 may be non-existent. The gap 82 is also preferably dimensioned to inhibit significant transverse movement of the post 52 when positioned within the aperture 80 when the panel array 43 is folded. As used herein, the term "transverse" refers to a direction substantially parallel to the front surfaces 40 of the panels 36. The coupling of the post 52 with the cavity 54 therefore inhibits transverse movement of the panels 36a relative to the panel 36b.

The fingers 66 are preferably configured to be highly resistant to deformation in the transverse direction. However, the fingers 66 are preferably less resistant to deformation in an outward direction with respect to the bottom surface 60 of the cavity 54.

As mentioned, the shear tie devices 50 are preferably configured to automatically decouple in response to a change in environment or ambient conditions. In the embodiment described herein, the shear tie devices 50 decouple in response to a change in ambient pressure conditions, such as the reduction in ambient pressure that occurs between earth atmosphere and outer space. An actuator is configured to decouple the shear tie device. With reference to FIG. 7, the actuator may comprise an inflatable device, such as a balloon or bladder 84, is disposed within the cavity 54. The bladder 84 is preferably annular so that it extends around the post 52 when the post is positioned within the cavity 54. In the default or deflated state, the bladder 84 is dimensioned to be positioned entirely within the cavity 54 such that the bladder 84 exerts little or no pressure against the bottom surface 70 of the fingers 66 when the post 52 is disposed within the cavity 54. The bladder 84 remains deflated at a particular ambient or atmospheric pressure.

The bladder 84 is configured to expand in response to a change in the environment surrounding the shear tie device 50. As the ambient pressure is decreased, the pressure differential between the interior pressure of the bladder 84 and the ambient pressure causes the bladder 84 to inflate and expand in size relative to its deflated size. When ambient pressure decreases below a threshold pressure value, the bladder 84 expands to a volume greater than the volume of the cavity minus the volume consumed by the post 52. In order to continue expanding, the bladder 84 exerts an outward pressure against the bottom surface 70 of the fingers 66.

Figure 8:
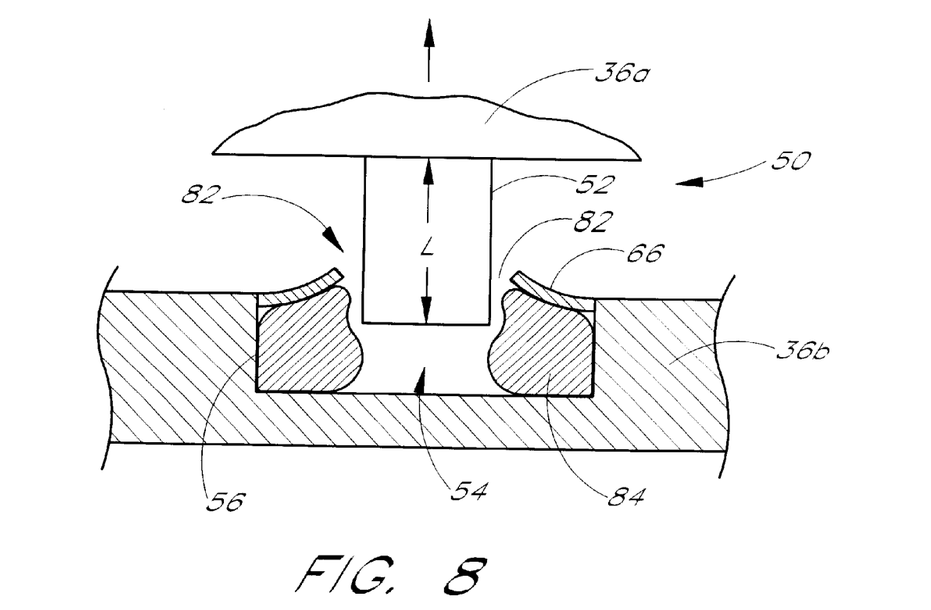
FIG. 8 is a cross-sectional view of the shear tie device at a reduced atmospheric pressure.

With reference to FIG. 8, as it expands in size, the bladder 84 preferably exerts sufficient outward pressure on the fingers 66 to cause the fingers 66 to deformably yield in a direction away from the bottom wall 60 of the cavity 54. As the fingers 66 are deflected in a direction away from the bottom wall 60 of the cavity 54, the inner edges 74 of the fingers 66 move away from the post 52 so that the size of annular gap 82 increases. This increases the size of the aperture 80 so that the post 52 may more easily slide through the aperture 80 and out of the cavity 54. Preferably, the upwardly moving fingers 66 also exert an outward force on the panel 36a so that the fingers 66 push the panel 36a away from the panel 36b. The post 52 thereby disengages from the cavity 54.

Preferably, the bladder 84 inflates to a size sufficient to deform the fingers 66 when ambient pressure is reduced to a value below a threshold pressure. It will be appreciated that the articulated pressures are for reference only, based on the expected state transitions experienced by a spacecraft from launch to orbit. The annular bladder 84 may be pressurized so as to expand over any desired pressure gradient. The bladder 84 is desirably manufactured of a material that is configured to expand in size without bursting.

Figure 9:
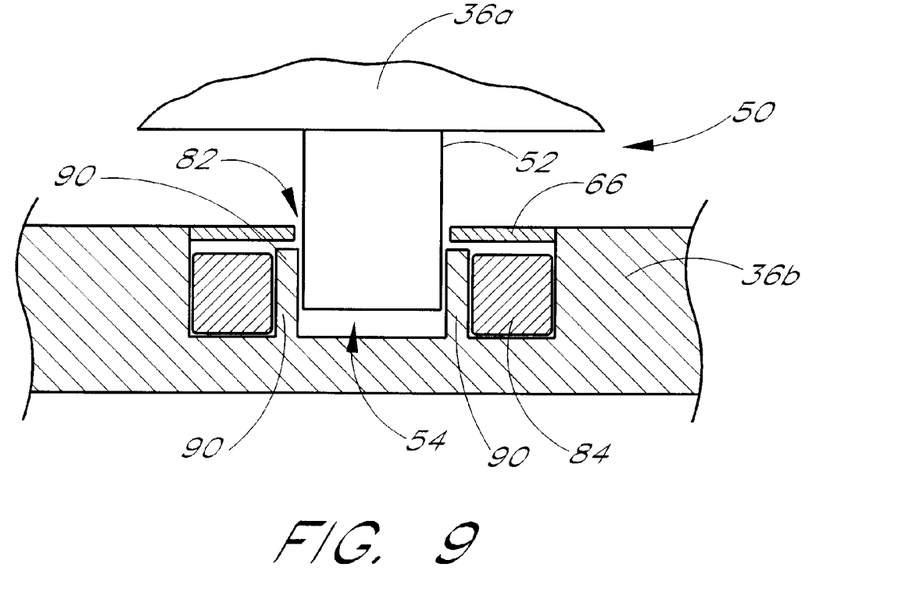
FIG. 9 is a cross-sectional view of an alternate embodiment of the shear tie device.

FIG. 9 shows another embodiment of the shear tie device 50. In this embodiment, an annular wall 90 extends upwardly from the bottom wall 60 of the cavity 54. A space is defined between the annular wall 90 and the side wall 56 of the cavity. The bladder 84 is desirably positioned within this space. As discussed above regarding the previous embodiment, the bladder 84 is dimensioned to exert little or no pressure against the fingers 66 when disposed within the cavity 84 at a predetermined ambient pressure.

Figure 10:
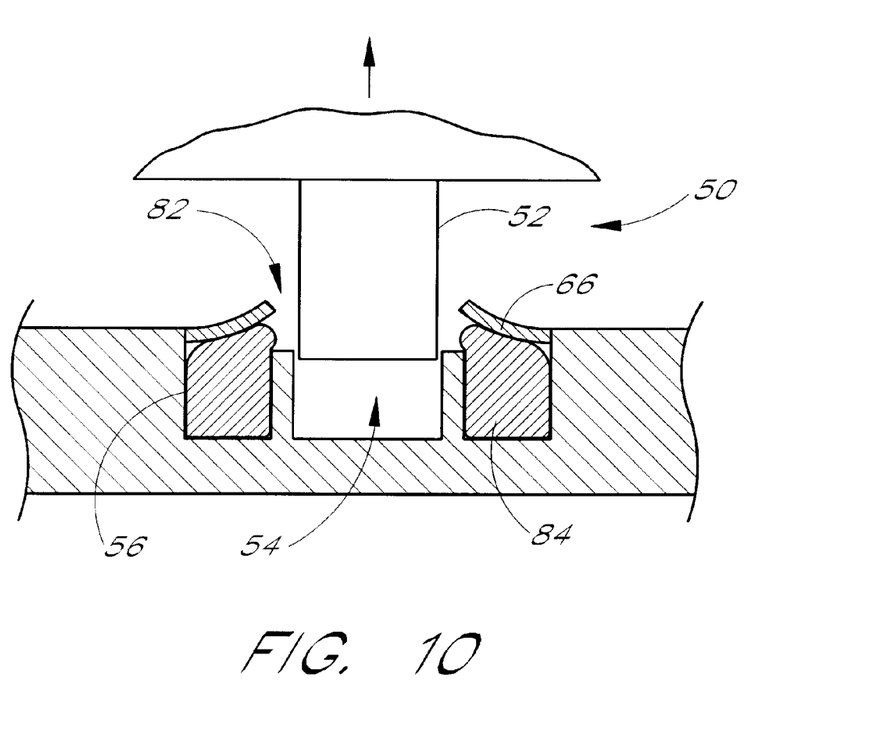
FIG. 10 is a cross-sectional view of the alternate embodiment of the shear tie device at a reduced atmospheric pressure.

As shown in FIG. 10, the bladder 84 expands when exposed to an atmospheric pressure below the threshold value. Advantageously, the annular wall 90 inhibits the bladder 84 from abutting the post 52 as it expands. This reduces the likelihood of the bladder 84 squeezing the post 52 and inhibiting the post 52 from sliding out of the cavity 54 as the fingers 66 are deformed. The annular wall 90 also acts as a guide that directs the expansion of the bladder 84 toward the fingers 66.

In operation, the panel array 34 is preferably equipped with a plurality of shear tie devices 50. The panel array is placed in the folded state so that each of the posts 52 mate with their corresponding cavities 54. Preferably, the bladder 84 is in the deflated state when the panel array 34 is exposed to an ambient pressure greater than or equal to the atmospheric pressure at the earth's surface. The satellite 30 may be launched into orbit in a well known manner. Advantageously, the coupling of the male and female members of the shear tie devices 50 increases the rigidity of the panel array 34 during launch by inhibiting transverse movement of one panel relative to the other and distributing the shear forces thereover.

The male and female members of the shear tie devices 50 are advantageously configured to automatically decouple from one another in response to a change in environmental conditions, such as in response to the environmental state change that naturally occurs as the satellite transitions from earth to orbit. Preferably, the change in environmental pressure triggers the decoupling of the male member from the female member. When the satellite 30 reaches orbit in outer space, the bladder 84 expands as a result of the decrease in ambient pressure to the near-vacuum pressure conditions in outer space. As discussed above, the bladder 84 desirably expands to a size sufficient to deflect or deform the fingers 66 away from the bottom wall 60 the cavity 54. As they are deflected, the fingers 66 exert a force against the panels 36 to push the panels 36 away from one another so that the panel array deploys. Advantageously, the size of the aperture 80 increases as a function of decrease in pressure to greatly reduce the likelihood of the post 52 jamming or becoming caught by the fingers 66.

Although the foregoing description of the preferred embodiment of the invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. An expandable structure for a spacecraft, the expandable structure comprising:
    a first section having a first surface;
    a second section having a second surface, wherein the first section and the second section are coupled together in a storage configuration during launch of the spacecraft so that the first surface of the second section is retained adjacent the second surface of the second section to thereby inhibit relative movement of the first and second sections with respect to each other;
    a securing device that interconnects the first section and the second section of the expandable structure of the spacecraft in the storage configuration, wherein the securing device includes an actuating mechanism, responsive to the environment surrounding the securing device so that the actuating mechanism releases the securing device upon the spacecraft reaching space so as to release the first section and the second section from the storage configuration.

2. The structure of claim 1, wherein the securing device comprises:
    a first male member positioned on the first section;
    a second member defining a receptacle for the male member positioned on the second section;
    a securing member positioned within the receptacle so as to engage with the first male member to inhibit relative movement of the first section and the second section with respect to each other.

3. The structure of claim 2, wherein the securing member is deformable by application of a force applied in a direction substantially parallel to the axis of the first male member so that the deformable securing member disengages with the first male member, and wherein the actuating mechanism exerts a force in a direction substantially parallel to the axis of the first male member in response to the actuating mechanism being positioned in space.

4. The structure of claim 3, wherein the actuating mechanism is comprised of a gas filled bladder that, when disposed in outer space, expands to deform the securing member in to thereby release the first male member from the receptacle defined by the second member.

5. A retaining assembly for retaining two sections of an expandable spacecraft structure, the retaining comprising:
    a first connector mounted on the first section;
    a second connector mounted on the second section, wherein the first connector and the second connector engage with each other so as to prevent relative movement in at least a first direction of the first and second sections;
    a securing mechanism that secures the engagement of the first connector and the second connector, wherein the securing mechanism defines a movable decoupling surface that moves in response to a first change of a selected environmental factor surrounding the spacecraft such that movement of the decoupling surface results in the decoupling surface engaging with the first connector to result in the first and second connectors automatically disengaging from each other.

6. The assembly of claim 5, wherein the securing mechanism comprises a deformable member that engages with the first connector so as to retain the first connector in engagement with the second connector.

7. The assembly of claim 6, wherein the decoupling surface moves so as to engage with the deformable member to thereby deform the deformable member to thereby disengage the first connector from the second connector.

8. The assembly of claim 7, wherein the securing mechanism includes a fluid filled bladder which defines the decoupling surface.

9. The assembly of claim 8, wherein the fluid filled bladder is comprised of a gas filled bladder that expands in response to a decrease in pressure as a result of the spacecraft being positioned in outer space.

10. The assembly of claim 5, wherein the first connector comprises a post and the second connector defines a receptacle adapted to receive the post and retain the post therein.

11. An apparatus for coupling a first panel to a second panel, comprising:
    at least one male member extending outwardly from a surface of the first panel;
    at least one female member extending into a surface of the second panel, the female member positioned to receive the male member when the first panel is juxtaposed with the second panel;
    at least one finger extending radially into the female member, the finger defining an aperture sized to receive the male member;
    a bladder positioned within the female member, the bladder consuming a first volume when exposed to a first ambient pressure and a second volume when exposed to a second ambient pressure below the first ambient pressure, wherein the bladder exerts a force on the finger sufficient to deform the finger and increase the size of the aperture when the bladder is at the second volume.

12. The apparatus of claim 11, wherein the at least one finger comprises a plurality of fingers having inner edges that collectively define the aperture.

13. The apparatus of claim 11, wherein a gap is defined between the inner edges of the plurality of fingers and the male member when the male member is positioned within the aperture.

14. The apparatus of claim 11, wherein the male member comprises a cylindrical post.

15. A spacecraft, comprising:
- a first panel defining a front surface;
- a second panel defining a front surface, the first and second panel configured to move between a folded position wherein the front surfaces are juxtaposed and a deployed position wherein the first and second panels are aligned within a common plane;
- at least one male member on the front surface of the first panel;
- at least one female member on the front surface of the second panel, the female member defining an aperture configured to receive the male member therein when the first and second panels are in the deployed position, wherein the size of the aperture increases as ambient pressure decreases.

16. The apparatus of claim 15, wherein the female member comprises a cavity extending into the front surface of the second panel.

17. The apparatus of claim 16, wherein the female member additionally comprises a plurality of radial fingers coupled to the cavity, wherein the fingers define the aperture.

18. The apparatus of claim 17, additionally comprising an expandable bladder disposed within the cavity.

19. The apparatus of claim 18, wherein the bladder expands in volume as ambient pressure decreases.

20. The apparatus of claim 19, wherein the bladder exerts a force on the fingers as the bladder expands in volume to deform the fingers and increase the size of the aperture.

* * * * *